US010386187B1

(12) United States Patent
Shahriar et al.

(10) Patent No.: US 10,386,187 B1
(45) Date of Patent: *Aug. 20, 2019

(54) ROTATION AND ACCELERATION SENSOR BASED ON NONDEGENERATE RING LASERS

(71) Applicant: Digital Optics Technologies, Incorporated, Rolling Meadows, IL (US)

(72) Inventors: Selim M. Shahriar, Kildeer, IL (US); Nicholas J. Condon, Evanston, IL (US); Devin J. Hileman, Des Plaines, IL (US); Shih C. Tseng, Arlington Heights, IL (US)

(73) Assignee: Digital Optics Technologies, Inc., Rolling Meadows, IL (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/530,463

(22) Filed: Jan. 18, 2017

Related U.S. Application Data (63) Continuation of application No. 15/330,163, filed on Aug. 17, 2016.

(60) Provisional application No. 62/283,127, filed on Aug. 18, 2015.

(51) Int. Cl.
*G01C 19/68* (2006.01)
*G01C 19/66* (2006.01)

(52) U.S. Cl.
CPC ........... *G01C 19/68* (2013.01); *G01C 19/661* (2013.01)

(58) Field of Classification Search
CPC .... G01C 19/662; G01C 19/68; G01C 19/728; G01C 19/661; H01S 5/1071
See application file for complete search history.

(56) References Cited

U.S. PATENT DOCUMENTS

| 4,135,822 | A  | * | 1/1979 | Ezekiel   | G01C 19/727 356/461 |
| 4,807,999 | A  | * | 2/1989 | Soo Hoo   | G01C 19/727 356/470 |
| 5,386,288 | A  | * | 1/1995 | Martin    | G01C 19/68 356/467 |
| 6,424,419 | B1 | * | 7/2002 | Tazartes  | G01C 19/665 356/473 |
| 6,937,342 | B2 | * | 8/2005 | Osinski   | G01C 19/72 356/461 |

(Continued)

OTHER PUBLICATIONS

Double-Raman Gain for Realizing a Superluminal Ring laser, 2013, Optical Society of America (Year: 2013).*

(Continued)

*Primary Examiner* — Michael P LaPage (74) *Attorney, Agent, or Firm* — Richards Patent Law P.C.

(57) ABSTRACT

Ring laser gyroscopes, in which rotation is detected by the Sagnac effect between counterpropagating lasers, are in common use in navigation applications. The invention disclosed here uses lasers operating at different frequencies; the resulting device is referred to as a Nondegenerate Ring Laser Gyroscope (NRLG). The invention disclosed here also incorporates an acceleration-sensing element that modifies the path length of the ring lasers in the gyroscope, the effects of which on the output of the gyroscope can be separated from those of rotation. The resulting composite device is a Nondegnerate Ring Laser Gyroscope/Accelerometer (NRLGA).

12 Claims, 6 Drawing Sheets

(56) References Cited

U.S. PATENT DOCUMENTS

| | | | | |
|---|---|---|---|---|
| 9,001,336 B1* | 4/2015 | Qiu | ................ | G01C 19/727 |
| | | | | 356/461 |
| 2010/0232460 A1* | 9/2010 | Canham | ................ | H01S 3/0387 |
| | | | | 372/25 |
| 2011/0255094 A1* | 10/2011 | Mohageg | ................ | G01C 19/72 |
| | | | | 356/461 |
| 2013/0070253 A1* | 3/2013 | Salit | ................ | G01C 19/66 |
| | | | | 356/468 |
| 2015/0204669 A1* | 7/2015 | Thorland | ............ | G01C 19/661 |
| | | | | 356/471 |

OTHER PUBLICATIONS

Yum et al., Superluminal ring laser for hypersensitive sensing, Aug. 2010, Optics Express, vol. 18, No. 17 (Year: 2013).*

Pati et al., Controllable Anomalous Dispersion and Group Index Nulling via Bi-Frequency Raman Gain in Rb Vapor for application to Ultraprecision Rotation Sensing, Jan. 2006, 10.1109/CLEO.2006.4629099 (Year: 2006).*

* cited by examiner

ROTATION AND ACCELERATION SENSOR BASED ON NONDEGENERATE RING LASERS

STATEMENT REGARDING FEDERALLY SPONSORED RESEARCH OR DEVELOPMENT

This invention was made with government support under HQ0147-15-C-7123 awarded by the Missile Defense Agency, FA8651-13-C-0011 awarded by the Air Force, FA8651-13-C-0018 awarded by the Air Force, FA9453-14-C-0191, awarded by the Air Force, and NNX15CM35P awarded by the National Aeronautics and Space Administration. The government has certain rights in the invention.

BACKGROUND OF INVENTION

1. Field of the Invention

The present invention relates generally to devices for measuring their own absolute rotation and acceleration and specifically to such devices constructed using optical means.

2. Description of the Background Art

Careful determinations of orientation and acceleration are critical to applications such as the navigation of air and space vehicles and the direction and stabilization of sensors and communications equipment on such platforms. With knowledge of starting orientation and position and a complete history of all rotations and accelerations, the orientation and position of the object can be determined at any time. In the absence of external referents (which may be transient or prolonged), it is necessary to measure orientation and position continuously on all six axes (three accelerations, three rotations). There are a number of technologies to provide rotation and acceleration sensing currently in use.

Mechanical gyroscopes, which use the rotational inertia of a spinning rotor, are one option for sensing rotation, but their complexity and weight limit their application in practice. In 1963 [1], the first ring laser gyroscope (RLG) was demonstrated. These gyroscopes make use of the Sagnac effect to sense rotation. Briefly, an RLG in operation can be considered as two lasers operating simultaneously in the same beam path: One clockwise, the other counterclockwise. If the RLG undergoes a rotation in the plane of its ring, the two lasers will experience frequency shifts in opposite directions. Monitoring the beat frequency between the two lasing directions thus provides a measure of the rotation rate of the RLG whose sensitivity is proportional to the area enclosed by the ring. Three RLGs, oriented perpendicular to one another, are capable of measuring the absolute rotations in all directions of the platform to which they are attached. One issue with conventional RLGs is the phenomenon of lock-in[2], in which scattering causes the frequencies of the two lasers to become locked together. This causes the beatnote between the two lasers not to change in response to small rotation rates, placing a limit on their utility in slowly rotating systems; various modulation techniques have been used to mitigate this problem.[3] Operating the lasers at nondegenerate frequencies, preferably with a constant, controlled offset frequency between them, would prevent lock-in entirely.

Accelerometers have been developed based on a number of sensing methods centering on a mass that exerts a force on a sensor or moves relative to the rest of the system. Current state-of-the-art systems often use piezoelectric quartz crystals[4] for sensing. If a mirror is affixed to a mount such that it can move in response to acceleration in the direction normal to its reflective surface, then, in the limit of small movements, its displacement will be proportional to the acceleration in that direction. Incorporation of this mirror into an interferometer to measure the resultant length change creates an optical accelerometer. An optical accelerometer could also be created by incorporating this acceleration-sensitive mirror into an active laser cavity; motions of the mirror would correspond to shifts in the lasing wavelength of the cavity. A composite device, consisting of two counterpropagating nondegenerate Raman ring lasers in a cavity incorporating an acceleration-sensitive mirror, would be capable of sensing both rotation and acceleration, and thus would be a Nondegenerate Ring Laser Gyroscope/Accelerometer (NRLGA).

SUMMARY OF THE INVENTION

Accordingly, it is an object of this invention to measure, by means of the Sagnac effect in ring lasers, the rotational rate of an object.

It is another object of this invention to eliminate the problem of lock-in in optical gyroscopes.

It is another object of this invention to measure, by means of an active laser cavity containing an acceleration-sensitive mirror assembly, the acceleration of an object.

It is another object of this invention to combine both rotation and acceleration sensing in a single cavity.

These and other objects of this invention are accomplished by a system consisting of two ring lasers, sharing a common cavity and lasing in opposite directions, to comprise a Nondegenerate Ring Laser Gyroscope (NRLG), with the inclusion of an acceleration-sensitive mirror to simultaneously produce a Nondegenerate Ring Laser Accelerometer (NLRA). The combined Nondegenerate Ring Laser Gyroscope/Accelerometer (NRLGA) would be capable of sensing rotation around one axis and acceleration in a perpendicular axis. Three such NRLGA's may be positioned with mutually perpendicular ring planes to allow measurement of the complete inertial motion of a platform.

BRIEF DESCRIPTION OF THE DRAWINGS

A more complete appreciation of the invention will be readily obtained by reference to the following Description of the Preferred Embodiments.

FIGS. 2A through 2E show, schematically, the layout and configuration of the components of a laboratory-scale realization of the invention.

DESCRIPTION OF THE PREFERRED EMBODIMENTS

Figure 1:
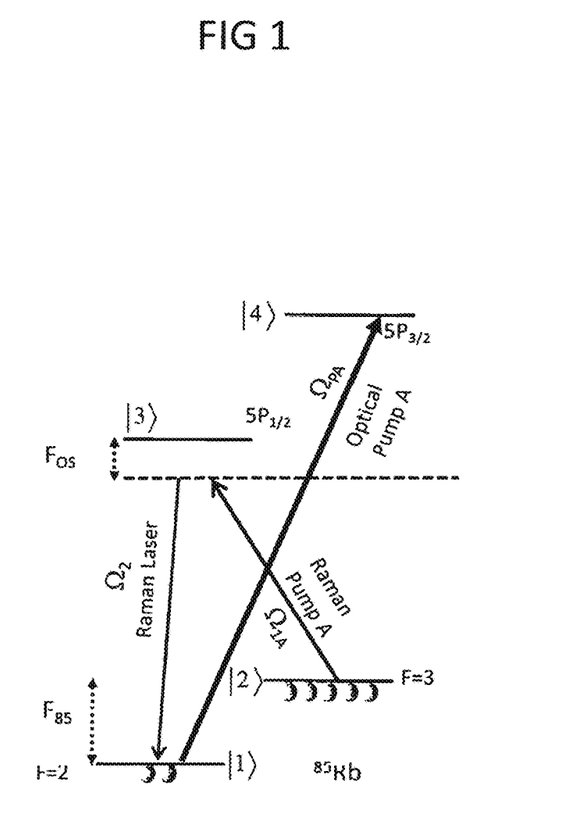
FIG. 1 shows the transitions in rubidium that are used to generate lasing in the invention.

A schematic of the energy levels and pumping scheme used to generate lasing in this invention are shown in FIG. 1. The optical pump laser depletes the ground state population, producing a population inversion between the two ground state hyperfine levels of $^{85}$Rb, allowing the Raman pump to stimulate gain at the Raman laser wavelength. The offset frequency, $F_{os}$, can be either positive or negative and can be imposed by an acousto-optic modulator (AOM) or an electro-optic modulator (EOM); in the embodiment described here, an EOM is used. For the NRLGA, $F_{os}$ would be positive for one direction and negative for the other.

To detect the NRLG signal, the outputs of the two Raman lasers are mixed on a photodetector. The output of the detector is then mixed with a VCO at a frequency that is the sum of the values of $F_{os}$ for the two directions, which is equal to the FSR of the cavity, and sent through a low-pass filter to eliminate the sum frequency. A voltage proportional to the output frequency would be generated by using the well-known PLL-FM demodulation technique (PLL: Phase-locked-loop; FM: Frequency Modulation). The sign of the rotation can be determined, for example, by changing the frequency of the VCO in one direction and monitoring the corresponding increase (for one sign) or decrease (for the other sign) in the final output signal.

For long observation periods, or for applications demanding extreme precision, fluctuations in the cavity length cannot be ignored. A change in the cavity length will produce a shift in the resonance frequency for each mode, and the corresponding change in the FSR. In order to account for and rectify errors resulting from such a change, it is necessary to employ the following common-mode rejection servo mechanism, made possible by the fact that the SRLG excitation beams include lasers locked to absolute frequency references. First, for each direction, we will detect the beat signal between the Raman pump and a small part of the Raman laser output, while the rest of the outputs of the Raman lasers will continue to be used for detecting and processing the beat signal between them. This beat frequency is converted to a voltage using a PLL-FM demodulator. We denote as $\delta f_m$ ($\delta f_{m-1}$) the resulting voltage signal for the clock-wise (counter-clock-wise) laser. Furthermore, we define the signals $\Sigma \equiv \delta f_m + \delta f_{m-1}$ and $\Delta \equiv \delta f_m - \delta f_{m-1}$, which can be easily generated. Consider now a situation where the sum of the two Raman laser frequencies have changed by an amount that corresponds to a voltage signal $\delta_{CM}$ due to a change in the cavity length (a common-mode effect), and the difference between the two Raman laser frequencies have changed by an amount that corresponds to a voltage signal $\delta_{SE}$ due to the Sagnac effect (i.e., rotation). A straightforward analysis shows that $\delta_{SE} = Z[\Delta - (2m-1)\Sigma]$ and $\delta_{CM} = Z[\Sigma - (2m-1)\Delta]$, where $Z = (2m-1)/[(2m-1)^2 - 1]$. For $m \gg 1$, this simplifies to $\delta_{SE} \approx (-\Sigma + \Delta/2m)$, and $\delta_{CM} \approx (-\Delta + \Sigma/2m)$, each of which can be generated as a voltage signal, given the determined value of m. The value of $\delta_{CM}$ will be used as a feedback signal to correct for the fluctuations in the cavity length, producing the condition that $\delta_{CM} = 0$. Under this condition, we then also get $\delta_{SE} = -\Sigma(1 - 4/m^2) \approx -\Sigma$. However, in order to ensure that the quantum noise in the final NRLG signal is from the Raman lasers only, we will use the output of the detection system which involves mixing of the Raman lasers only.

The schematic for a combined nondegenerate ring laser gyroscope and accelerometer (NLRGA) is shown in the five parts of FIG. 2. FIG. 2A shows the overview of the entire system and the lasers and optics that couple them together. There are five modules in the system: The clockwise (CW) Raman laser pump module, the counterclockwise (CCW) Raman laser pump module, the optical pump module, the ring laser module, and the readout module. Each Raman laser pump module produces an output that is a 795 nm laser necessary to pump the $^{85}$Rb Raman gain process responsible for lasing. Each of them also provide a pickoff from the laser for locking and stabilization. The optical pump module provides two identical outputs at 780 nm, tuned for the optical pumping of $^{85}$Rb. Each Raman pump output is combined with one of the two optical pump outputs on a dichroic beam combiner and the resulting combined set of beams is directed into one input to the ring laser module. The outputs from the ring laser module, along with the pickoffs of the Raman pump lasers, are directed into the readout module. The readout module then produces the desired rotation and acceleration signals, as well as providing a lock signal to the PZT in the ring laser module. Each module of this system is next described in detail individually.

Figure 2A:
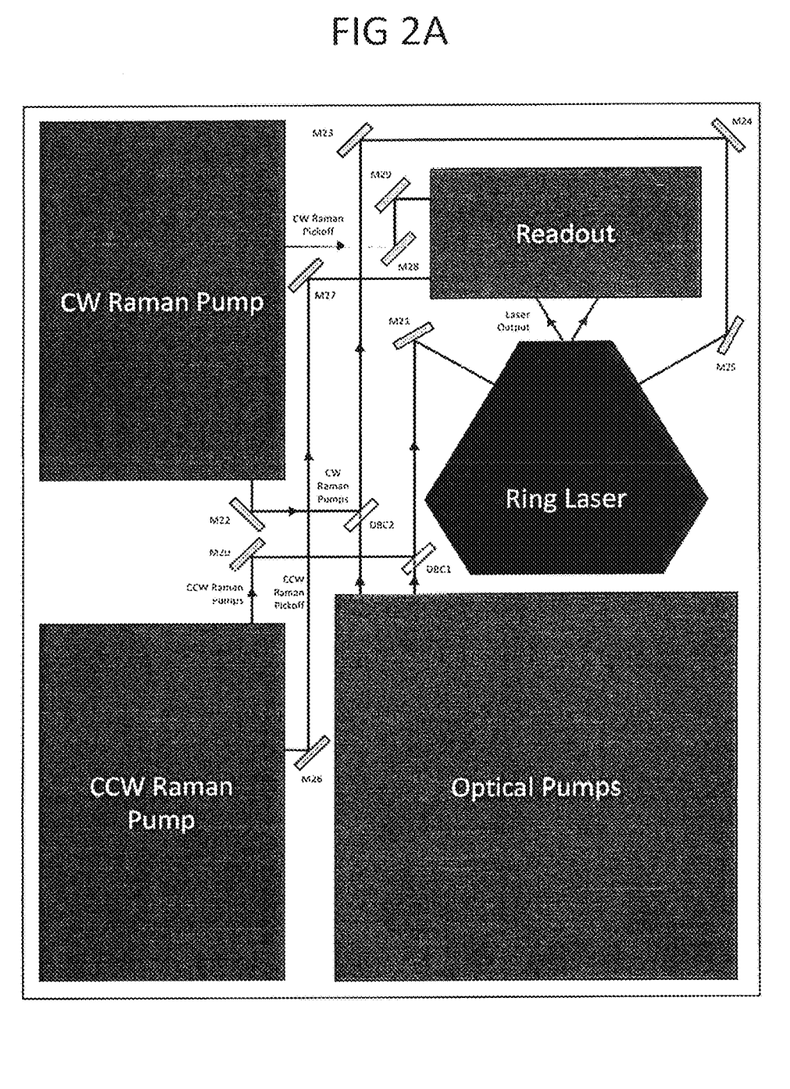
FIG. 2A shows the layout of the various modules and the optics and laser beam lines connecting the modules.
Figure 2B:
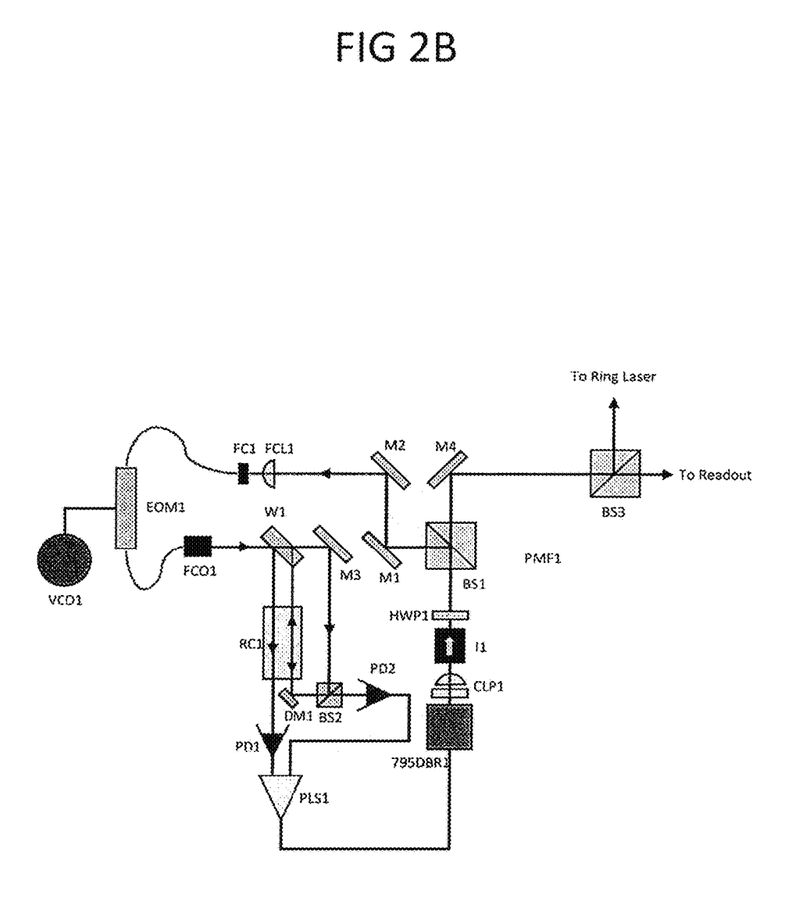
FIG. 2B shows a schematic of a Raman pump module.

The two Raman pump modules are functionally identical, differing only in the frequency offsets provided to the lasers. The schematic of one Raman pump module is shown in FIG. 2B. It contains one 795 nm DBR laser. The output of this laser (795DBR1) will be the pump for the Raman lasing process. It is collimated, passed through an isolator and a half-wave plate, and split (BS1) into two equal-powered beams. One of these beams is focused into the fiber input of an electro-optic intensity modulator (EOM1). A voltage-controlled oscillator (VCO1) is connected, through appropriate amplifiers, to the EOM, which splits the laser into a carrier and a series of odd-ordered sidebands. One of the first-order sidebands will be selected for locking to an $^{85}$Rb resonance. The output of the modulator is then sent back into free space and into a saturated absorption system. An uncoated, thick flat window (W1) reflects two low-power pickoffs of the beam through a heated rubidium vapor cell (RC1). The remainder of the beam is reflected into a 50/50 beamsplitter (BS2), which directs part of it back along the same path as one of the two low-power pickoffs. One photodetector (PD1) measures the unsaturated absorption signal, while a second (PD2) measures the saturated absorption signal. A locking servo (PLS1) dithers the laser frequency across a small portion of the $^{85}$Rb absorption spectrum and uses the difference between the saturated and unsaturated outputs to lock the EOM-shifted laser frequency to one of the hyperfine resonances of $^{85}$Rb. This means that the frequency of the DBR output itself is thus locked at a constant offset frequency (determined by the VCO and the choice of sidebands) from the $^{85}$Rb resonance. This output is directed (after combination with one of the outputs of the optical pump module) into the ring laser module.

Figure 2C:
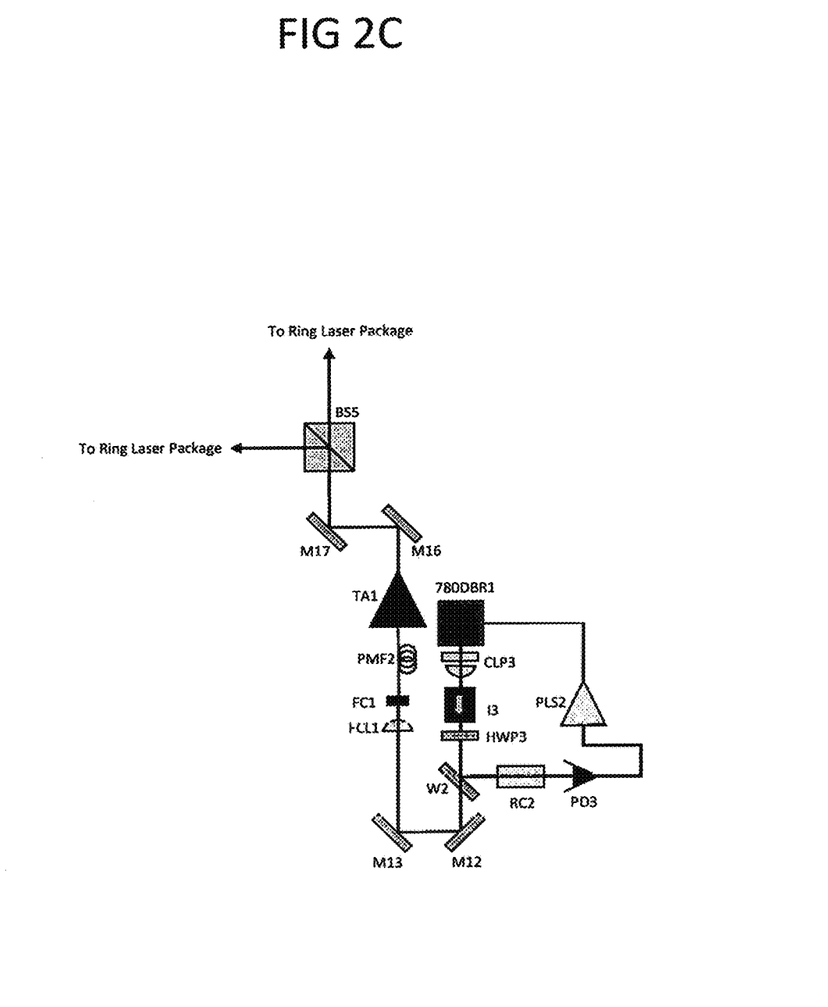
FIG. 2C shows the schematic of the optical pump module.

The optical pumps for the clockwise and the counter-clockwise laser are provided by the two outputs of the optical pump modules, shown in FIG. 2C. This module contains a 780 nm DBR laser (780DBR1), an amplifier, and the equipment necessary to lock it to a $^{85}$Rb absorption transition. The DBR output is collimated and passed through an isolator and half-wave plate, then a pickoff from it is passed through a heated rubidium vapor cell (RC2) and into a photodetector. A servo (PLS2) uses the signal from the photodetector to lock the frequency of the DBR to the appropriate transition. The beam is then directed into a fiber-coupled tapered amplifier (TA1) to increase its power to appropriate levels. The output of the tapered amplifier is directed to a 50/50 beamsplitter (BS5), and the two outputs of the beamsplitter are directed individually (after combination with one of the Raman pump module outputs) into the ring laser module.

Figure 2D:
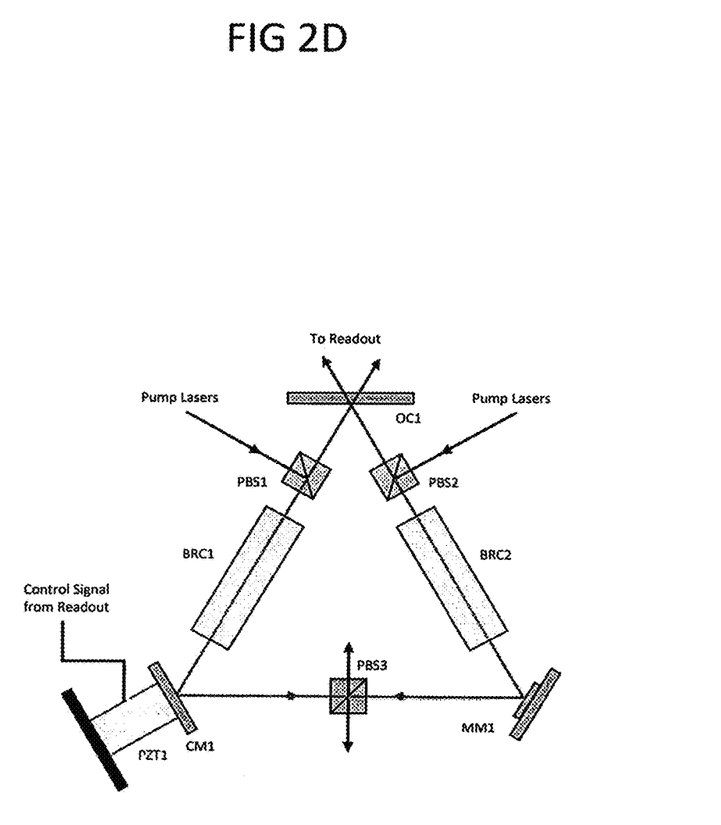
FIG. 2D shows the schematic of the ring laser module.

The heart of the NLRGA is the ring laser module, a schematic of which is shown in FIG. 2D. It produces a pair of counter-propagating Raman lasers that share a common path. Each combined set of Raman and optical pump lasers is directed in the vertical polarization into a polarizing beamsplitter (PBS1/PBS2) and is dumped out of the cavity before completing a round trip by a common polarizing beamsplitter (PBS3). The lasers propagate in the horizontal polarization and pass through the polarizing beamsplitters unaffected. Gain is provided by two rubidium vapor cells (BRC1 and BRC2) that contain a helium buffer gas to allow for narrower transitions. The triangular cavity is defined by three mirrors. One mirror (CM1) is a high reflector attached to a PZT cylinder to allow for active control of the cavity length by a servo in the readout module. The second mirror (MM1) is a gold mirror on MEMS-fabricated springs; the motion of this mirror allows for acceleration detection. The third mirror (OC1) is a concave output coupler whose curvature and reflectivity are chosen to provide optimal laser performance. The laser outputs are directed into the readout module for measurement. The entire module is contained within a monolithic machined aluminum body that is contained within a mu metal shield to protect against interference from external magnetic fields. This body is heated with resistance wire to the temperature necessary to provide the rubidium vapor pressure needed for optimal laser performance.

Figure 2E:
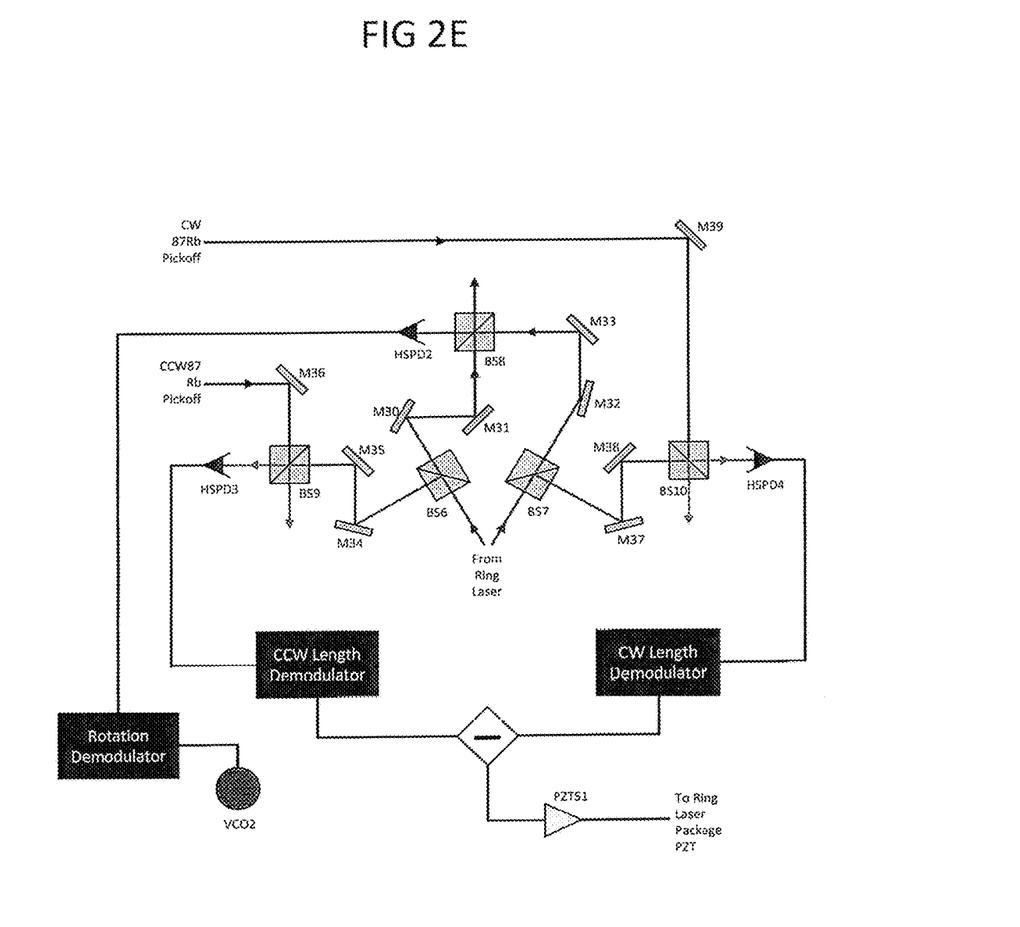
FIG. 2E shows the schematic of the readout module.

The readout module measures the frequency differences induced in the two output lasers in order to extract the rotation rate and linear acceleration experienced by the ring laser module; a schematic of this module is shown in FIG. 2E. There are four inputs to this module: The two laser outputs and the pickoffs from the two Raman pump lasers. A pickoff from each optical pump (BS6/BS7) is combined on a 50/50 beamsplitter (BS9/BS10) with its corresponding Raman pump and the resulting beatnote is detected with a high-speed photodetector (HSPD3/HSPD4). The output of each detector is demodulated using a phase-locked loop to provide a DC signal proportional to the departure of each output laser frequency from the value expected of from an unmoving system. The difference between the demodulated signals for the clockwise and counterclockwise lasers is then taken. This difference signal provides a measure of the cavity length changes due to movement of the MEMS-mounted mirror, from which the acceleration on the system can then be determined. This signal is then fed back through a servo (PZTS1) to the PZT in the ring laser module to correct the cavity length. The two lasers are then combined with each other on a 50/50 beamsplitter (BS8) and its output is directed into another high-speed photodetector (HSPD2). The beatnote measured by this detector is then mixed with the output of a voltage controlled oscillator (VCO2) set to match the frequency difference between the two output lasers expected from an unmoving system and is demodulated using a phase-locked loop demodulator. The signal from this demodulator is proportional to the rotation rate of the ring laser module, and thus provides the gyroscope signal.

CITED WORKS

[1] W. M. Macek and D. T. M. Davis, "Rotation Rate Sensing With Traveling Wave Ring Lasers," *Applied Physics Letters*, vol. 2, pp. 67-68, 1963.
[2] F. Zarinetchi and S. Ezekiel, "Observation of lock-in behavior in a passive resonator gyroscope," *Optics Letters*, vol. 11, pp. 401-403, Jan. 6, 1986 1986.
[3] R. B. Hurst, N. Rabeendran, K. U. Schreiber, and J.-P. R. Wells, "Correction of backscatter-induced systematic errors in ring laser gyroscopes," *Applied Optics*, vol. 53, pp. 7610-7618, Jan. 11, 2014 2014.
[4] S. Tadigadapa and K. Mateti, "Piezoelectric MEMS sensors: state-of-the-art and perspectives," *Measurement Science and Technology*, vol. 20, p. 092001, 2009.

We claim:

1. A device comprising: two counter propagating ring lasers sharing a common cavity, wherein the lasers are generated using a resonant Raman process in an alkali metal vapor, wherein the cavity contains a mirror mounted on an acceleration-sensitive element to generate acceleration detection; and
    an optical pump module, wherein the optical pump module includes a first 780 nm Distributed Bragg Reflector laser and a second 780 nm DBR laser, wherein the output of the first 780 nm DBR laser is locked to an $^{85}$Rb absorption transition, wherein the output of the second 780 nm DBR laser is locked to an $^{87}$Rb absorption transition, wherein the output of the lasers is passed through a heated rubidium vapor cell.

2. The device according to claim 1, wherein the outputs of the two ring lasers are combined and the resulting beat frequency is measured by a readout module, wherein the readout module includes a clockwise demodulator for receiving the clockwise resonant Raman laser signal and a counter clockwise demodulator for receiving a counter clockwise resonant Raman laser signal, wherein the readout module determines the difference in frequency between the clockwise demodulator and counter clockwise demodulator.

3. The device according to claim 1, wherein the device is used to measure rotational rate by a readout module, wherein the readout module includes a clockwise demodulator for receiving the a clockwise Raman laser signal and a counter clockwise demodulator for receiving a counter clockwise resonant Raman laser signal, wherein the readout module determines the difference in frequency between the clockwise demodulator and counter clockwise demodulator, wherein the difference is proportional to the rotational rate of the ring laser, wherein the readout module generates a gyroscope signal based on the difference.

4. The device according to claim 3, wherein the device is used to measure rotation and acceleration simultaneously.

5. The device according to claim 1, wherein the two lasers are operated at different frequencies.

6. The device according to claim 1, wherein the mirror mounted on an acceleration-sensitive element to generate acceleration detection is a mirror attached to a MEMS-fabricated spring, wherein motion of the mirror is used to measure acceleration.

7. A combined nondegenerate ring laser gyroscope and accelerometer device comprising:
    a clockwise resonant Raman laser pump module;
    a counter clockwise resonant Raman laser pump module;
    an optical pump module;
    a ring laser module including a laser gain medium, wherein the laser gain medium is the vapor of an alkali metal element; and
    a readout module,
    wherein the output from the clockwise resonant Raman laser pump module and the counter clockwise resonant Raman laser pump module combine with one of the two optical pump outputs on a dichroic beam combiner to form a combined set of beams,
    wherein the ring laser module receives the combined set of beams in a single cavity, wherein the ring laser module generates a pair of counter-propagating resonant Raman lasers in a single cavity, wherein the cavity contains a mirror mounted on an acceleration-sensitive element to generate acceleration detection, wherein the readout module receives the output of the ring laser module to produce a desired rotation and acceleration signal, wherein the optical pump module includes a first 780 nm Distributed Bragg Reflector laser and a second 780 nm DBR laser, wherein the output of the first 780 nm DBR laser is locked to an $^{85}$Rb absorption transition, wherein the output of the second 780 nm DBR laser is locked to an $^{87}$Rb absorption transition, wherein the output of the lasers is passed through a heated rubidium vapor cell.

8. The device of claim 7, wherein the clockwise resonant Raman laser pump module and the counter clockwise resonant Raman laser pump module produce an output of 795 nm.

9. The device of claim 7, wherein the ring laser module includes three mirrors defining a triangular cavity, wherein the mirror mounted on an acceleration-sensitive element is a gold mirror on MEMS-fabricated springs, wherein a second mirror is a high reflector attached to a PZT cylinder, wherein a third mirror is a concave output coupler.

10. The device of claim 7, wherein the ring laser module includes two rubidium vapor cells, wherein the output of the clockwise resonant Raman laser pump module passes through a first rubidium vapor cell, and the output of the counter clockwise resonant Raman laser pump module pass through a second rubidium vapor cell.

11. The device of claim 7, wherein the readout module includes a counter clockwise length demodulator and a clockwise length demodulator, wherein the readout module determines the difference in signal between the clockwise and counter clockwise demodulators, wherein the readout module provides a measure of the cavity length change due to movement of the MEMS-mounted mirror based on the difference.

12. The device of claim 7, wherein the readout module generates a gyroscope signal.

\* \* \* \* \*